United States Patent
Matsumoto

(10) Patent No.: US 8,606,082 B2
(45) Date of Patent: Dec. 10, 2013

(54) CONTENT REPRODUCTION APPARATUS AND POWER CONTROL METHOD

(75) Inventor: Takashi Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 128 days.

(21) Appl. No.: 13/412,791

(22) Filed: Mar. 6, 2012

(65) Prior Publication Data

US 2012/0163773 A1   Jun. 28, 2012

Related U.S. Application Data

(63) Continuation of application No. PCT/JP2010/004114, filed on Jun. 21, 2010.

(30) Foreign Application Priority Data

Dec. 3, 2009   (JP) .................................. 2009-275949

(51) Int. Cl.
*H04N 5/94* (2006.01)
*H04N 9/88* (2006.01)
*H04N 9/80* (2006.01)
*G11B 27/00* (2006.01)
*H04N 5/93* (2006.01)
*H04N 5/89* (2006.01)

(52) U.S. Cl.
USPC ........... 386/277; 386/263; 386/239; 386/248; 386/280; 386/314; 386/326; 386/353

(58) Field of Classification Search
USPC ......... 386/277, 263, 239, 248, 280, 314, 326, 386/353
See application file for complete search history.

(56) References Cited

U.S. PATENT DOCUMENTS 7,212,781 B2   5/2007   Hikomoto
7,450,973 B2   11/2008  Choi et al.
(Continued)

FOREIGN PATENT DOCUMENTS

JP   2004-297628   10/2004
JP   2005-109588   4/2005
(Continued)

OTHER PUBLICATIONS

Japanese Office Action issued in Japanese Patent Application No. 2011-544175 dated Mar. 13, 2012.
(Continued)

*Primary Examiner* — Daquan Zhao
(74) *Attorney, Agent, or Firm* — McDermott Will & Emery LLP

(57) ABSTRACT

Upon receiving a first instruction by an instruction receiving unit, a power supply control unit causes a first power supply unit to supply power to a first acquisition unit, and controls a second power supply unit so that power is not supplied to a second acquisition unit. A reproduction unit reproduces a first content acquired by the first acquisition unit. When a predetermined condition is met during a reproduction period in which the reproduction unit is reproducing the first content, the power supply control unit causes a second power supply unit to supply power to the second acquisition unit during the reproduction period. When the instruction receiving unit receives a second instruction, the reproduction unit reproduces a second content acquired by the second acquisition unit, and the power supply control unit causes the first power supply unit to stop the supplying of power to the first acquisition unit.

9 Claims, 5 Drawing Sheets

(56) References Cited

U.S. PATENT DOCUMENTS

| | | |
|---|---|---|
| 7,466,367 B2 | 12/2008 | DaCosta |
| 8,023,048 B2 | 9/2011 | DaCosta |
| 2004/0078819 A1 | 4/2004 | Sawada et al. |
| 2005/0122435 A1 | 6/2005 | Yunoki |
| 2005/0153650 A1 | 7/2005 | Hikomoto |
| 2006/0111156 A1 | 5/2006 | Choi et al. |
| 2006/0222317 A1* | 10/2006 | Ono et al. ............. 386/46 |
| 2007/0142082 A1 | 6/2007 | DaCosta |
| 2008/0211944 A1* | 9/2008 | Yamauchi ............ 348/294 |
| 2008/0246888 A1 | 10/2008 | Oh et al. |
| 2008/0256574 A1 | 10/2008 | Lee et al. |
| 2008/0320514 A1 | 12/2008 | DaCosta |
| 2009/0092011 A1* | 4/2009 | Matsushita et al. ......... 369/47.5 |
| 2009/0161507 A1* | 6/2009 | Matsushita et al. ......... 369/47.5 |
| 2011/0221969 A1 | 9/2011 | DaCosta |

FOREIGN PATENT DOCUMENTS

| | | |
|---|---|---|
| JP | 2005-109850 | 4/2005 |
| JP | 2006-523417 | 10/2006 |
| JP | 2007-88853 | 4/2007 |
| JP | 2007-104490 | 4/2007 |
| JP | 2008-139914 | 6/2008 |
| JP | 2008-521336 | 6/2008 |
| JP | 2009-520442 | 5/2009 |
| WO | WO 2004/080011 A1 | 9/2004 |
| WO | WO 2006/054878 A1 | 5/2006 |
| WO | WO 2007/078428 | 7/2007 |

OTHER PUBLICATIONS

International Search Report issued in International Patent Application No. PCT/JP2010/004114 dated Jul. 20, 2010.

\* cited by examiner

CONTENT REPRODUCTION APPARATUS AND POWER CONTROL METHOD

CROSS REFERENCE TO RELATED APPLICATION

This is a continuation application of PCT Patent Application No. PCT/JP2010/004114 filed on Jun. 21, 2010, designating the United States of America, which is based on and claims priority of Japanese Patent Application No. 2009-275949 filed on Dec. 3, 2009. The entire disclosures of the above-identified applications, including the specifications, drawings and claims are incorporated herein by reference in their entirety.

TECHNICAL FIELD

The present invention relates to a content reproduction apparatus for reproducing plural types of contents and a power control method.

BACKGROUND ART

In recent years, mobile terminal devices which can be carried by a user are increasingly becoming available. The mobile terminal devices generally operate with limited power accumulated in a secondary battery or the like. In view of the above, a variety of techniques for suppressing power consumption are disclosed.

Patent Literature 1 discloses a technique (hereinafter referred to as a conventional technique A) for suppressing power consumption by activating a wireless LAN I/F (local area network interface) only when necessary, in an information terminal which includes a processing unit which performs data communication using telecommunications network and the wireless LAN I/F which performs data communication using a wireless LAN.

CITATION LIST

Patent Literature

[PTL] Japanese Unexamined Patent Application Publication No. 2005-109850

SUMMARY OF INVENTION

Technical Problem

However, when the conventional technique A is applied to a content reproduction apparatus having a function of reproducing two contents of different types, a problem described below is posed.

The following describes a process performed by a mobile terminal device (hereinafter referred to as a content reproduction apparatus A) having a function of reproducing a content provided via broadcast waves and a content provided via wireless communications. In the description below, a content provided via the broadcast waves is referred to as a broadcast content. Furthermore, in the description below, a content provided via the wireless communications is referred to as a network content.

The content reproduction apparatus A includes, for example, an acquisition unit A for acquiring the broadcast content and an acquisition unit B for acquiring the network content The acquisition unit A includes, for example, a tuner or the like. The acquisition unit B has, for example, a communication function using the wireless LAN. The broadcast content and the network content are contents independently acquired by the acquisition unit A and the acquisition unit B, respectively.

In order to suppress power consumption of the content reproduction apparatus A as described above, it can be considered, for example, to perform control with which only the acquisition unit that acquires a content that is being reproduced is supplied with power and the other acquisition unit is not supplied with power, using the conventional technique A.

However, when a content that is reproduced by the content reproduction apparatus A is switched by a user from the broadcast content to the network content, for example, it poses a problem described below to perform control with which power is supplied to only one of the acquisition units as described above.

It is assumed here, as an example, that the content reproduction apparatus A reproduces the broadcast content. In addition, it is assumed here that the acquisition unit A is supplied with power and the acquisition unit B is not supplied with power. Furthermore, it is assumed here that a user performs an operation of switching the content to be reproduced by the content reproduction apparatus A from the broadcast content to the network content.

In this case, time is required for supplying power to the acquisition unit B when switching the content to be reproduced by the content reproduction apparatus A from the broadcast content to the network content. More specifically, it takes time before the acquisition unit B acquires the network content, which poses a problem that switching of reproduction between the two contents is not smoothly carried out. Furthermore, it is also considered to constantly supply power to both of the acquisition unit A and the acquisition unit B in order to solve the above-described problems; however, this increases the power consumption.

The present invention has been conceived in view of the above-described problems, and an object of the present invention is to provide a content reproduction apparatus and the like which allow smooth switching of reproduction between plural contents independently acquired while suppressing the power consumption.

Solution to Problem

In order to solve the problem described above, the content reproduction apparatus according to an aspect of the present invention includes: a first acquisition unit and a second acquisition unit each configured to acquire a content and operate during a period in which power is supplied; a first power supply unit configured to supply power to the first acquisition unit; a second power supply unit configured to supply power to the second acquisition unit; a power supply control unit configured to control the supply of power by each of the first power supply unit and the second power supply unit; and a reproduction unit configured to reproduce one of a first content and a second content, the first content being a content acquired by the first acquisition unit, and the second content being a content acquired by the second acquisition unit. In the content reproduction apparatus, when a predetermined condition related to a reproduction state of the first content is met during a reproduction period in which the reproduction unit is reproducing the first content, the power supply control unit is configured to cause the second power supply unit, which has stopped the supply of power, to supply power to the second acquisition unit in the reproduction period. Furthermore, the second acquisition unit is configured to acquire the second content after power is supplied from the second power supply unit, the reproduction unit is configured to reproduce the second content acquired by the second acquisition unit, and the power supply control unit is configured to cause the first power supply unit to stop the supply of power to the first acquisition unit, after the reproduction unit starts reproduction of the second content. The content reproduction apparatus further comprises an instruction receiving unit configured to receive an instruction for causing the reproduction unit to reproduce one of the first content and the second content. In the content reproduction apparatus, when the instruction receiving unit receives a first instruction for causing the reproduction unit to reproduce the first content, the power supply control unit is configured to cause the first power supply unit to supply power to the first acquisition unit, and to control the second power supply unit so that power is not supplied to the second acquisition unit, when the predetermined condition related to the reproduction state of the first content is met during the reproduction period in which the reproduction unit is reproducing the first content in response to the first instruction received by the instruction receiving unit, the power supply control unit is configured to cause the second power supply unit to supply power to the second acquisition unit in the reproduction period, and the second acquisition unit is configured to acquire the second content when the instruction receiving unit receives, during a period in which power is supplied by the second power supply unit, a second instruction for causing the reproduction unit to reproduce the second content.

More specifically, upon receipt of the first instruction by the instruction receiving unit, the power supply control unit causes the first power supply unit to supply power to the first acquisition unit, and controls the second power supply unit so that power is not supplied to the second acquisition unit. The reproduction unit reproduces the first content acquired by the first acquisition unit. When a predetermined condition is met during a reproduction period in which the reproduction unit is reproducing the first content, the power supply control unit causes the second power supply unit to supply power to the second acquisition unit during the reproduction period. The second acquisition unit acquires the second content when the instruction receiving unit receives the second instruction during the period in which power is supplied. When the instruction receiving unit receives the second instruction, the reproduction unit reproduces the second content, and the power supply control unit causes the first power supply unit to stop supplying power to the first acquisition unit. In other words, when the predetermined condition is met during the period in which the first content is reproduced, power is supplied to the second acquisition unit. More specifically, power is supplied to the second acquisition unit, and the second acquisition unit becomes operable during the reproduction of the first content. Then, in the case where the instruction receiving unit receives the second instruction, the reproduction unit reproduces the second content acquired by the second acquisition unit.

Accordingly, it is possible to smoothly perform switching of reproduction from the first content to the second content because the second acquisition unit is in the operable state at the time of the switching of reproduction from the first content to the second content. The first content and the second content are contents independently acquired by the first acquisition unit and the second acquisition unit, respectively. Thus, it is possible to smoothly perform switching of reproduction between independently acquired two contents.

In addition, the power supply control unit causes the first power supply unit to stop supplying power to the first acquisition unit. Accordingly, the period in which power is supplied to both of the first acquisition unit and the second power supply unit is a period starting from around the point immediately after the predetermined condition is met to around the point immediately after the instruction receiving unit receives the second instruction. This therefore allows shortening of the period as much as possible, in which power is supplied to both of the first acquisition unit and the second power supply unit, that is, the period in which the power consumption is large.

According to the above, it is possible to perform smooth switching of reproduction between plural contents independently acquired, while suppressing the power consumption.

In addition, it is preferable that the predetermined condition is a condition that the reproduction unit reproduces a portion close to an end of the first content.

In addition, it is preferable that the predetermined condition is a condition that a period in which receiving sensitivity of the first content is equal to or lower than a predetermined value continues for a predetermined amount of time, the first content being received by the first acquisition unit, and the predetermined value is a value at which the reproduction unit cannot properly reproduce the first content received by the first acquisition unit.

In addition, it is preferable that the predetermined condition is a condition that the number of times the content reproduced by the reproduction unit is changed in a predetermined amount of time is equal to or larger than a predetermined threshold.

In addition, it is preferable that the first content is a content provided via broadcast waves.

In addition, it is preferable that the second content is a content provided via a network.

A power control method according to another aspect of the present invention, which is performed by a content reproduction apparatus that includes: a first acquisition unit and a second acquisition unit each of which acquires a content and operates during a period in which power is supplied; a first power supply unit which supplies power to the first acquisition unit; a second power supply unit which supplies power to the second acquisition unit; a power supply control unit which controls the supply of power by each of the first power supply unit and the second power supply unit; and a reproduction unit which reproduces one of a first content and a second content, the first content being a content acquired by the first acquisition unit, and the second content being a content acquired by the second acquisition unit, comprises, when a predetermined condition related to a reproduction state of the first content is met during a reproduction period in which the reproduction unit is reproducing the first content, causing the second power supply unit, which has stopped the supply of power, to supply power to the second acquisition unit in the reproduction period, the causing being performed by the power supply control unit; and reproducing the second content acquired by the second acquisition unit, after power is supplied from the second power supply unit, the reproducing being performed by the reproduction unit.

It is to be noted that, some or all of the constituent elements of which the content reproduction apparatus as described above is configured may be implemented as a system LSI (Large Scale Integration).

It should be noted that the present invention can be implemented as a program which, when loaded into a computer, allows a computer to execute each of the steps included in the power control method. In addition, the present invention may be implemented as a non-transitory computer-readable recording medium for storing such a program. Furthermore, the program may be distributed via a transmission medium such as the Internet.

Advantageous Effects of Invention

The present invention enables smooth switching of reproduction between plural contents independently acquired, while suppressing the power consumption.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings.

DESCRIPTION OF EMBODIMENT

The following describes an embodiment of the present invention with reference to the drawings. In the description below, the same numerals are assigned to the same elements. Further, they share the same names and functions. Accordingly, detailed explanation for them will not be repeated.

Embodiment 1

Figure 1:
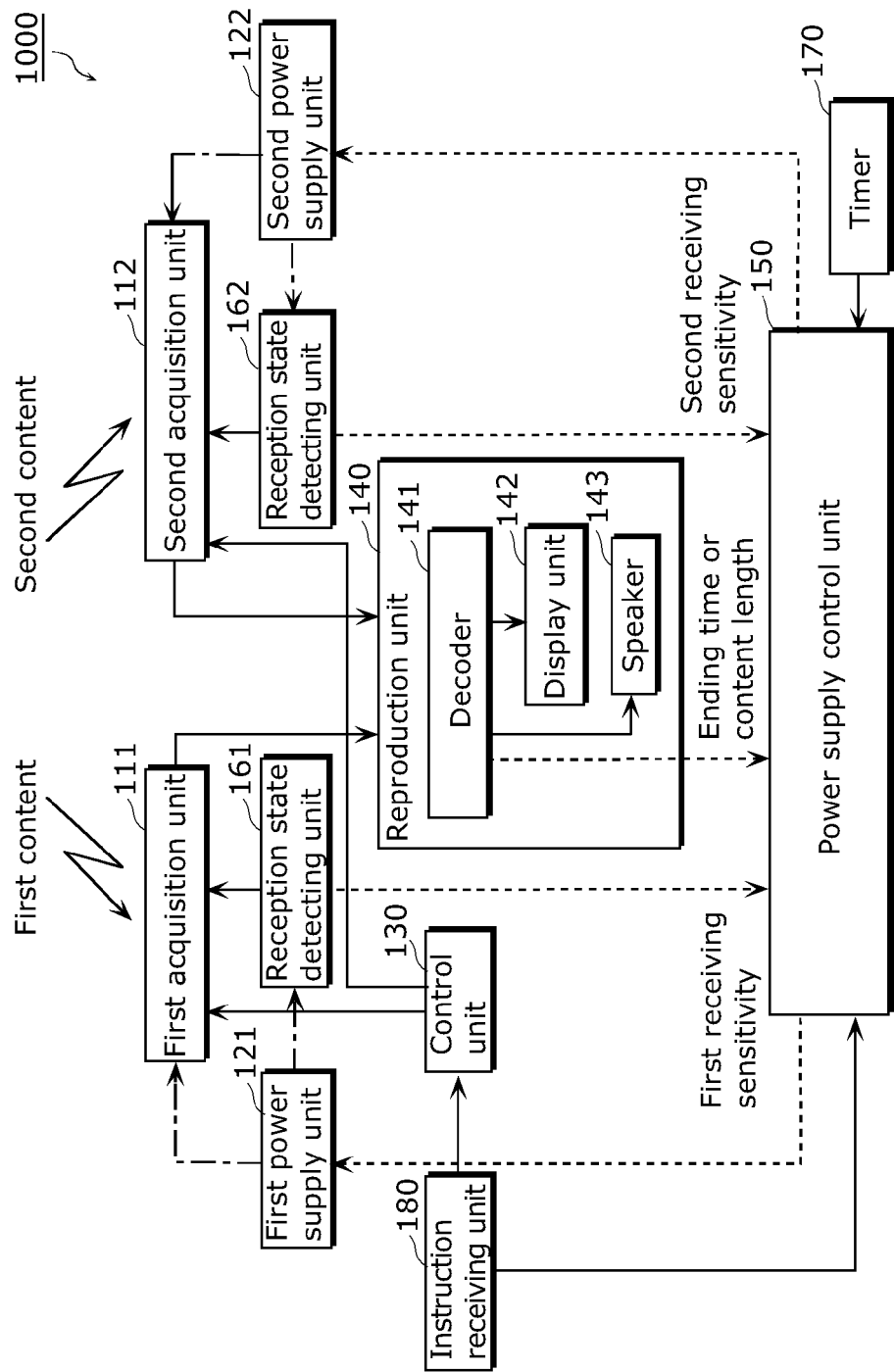
FIG. 1 is a block diagram which shows a configuration of a content reproduction apparatus.

FIG. 1 is a block diagram which shows a configuration of a content reproduction apparatus 1000.

The content reproduction apparatus 1000 is an apparatus capable of reproducing a content. A content includes video and audio in this description. It is to be noted that the content may include one of video and audio.

In the present embodiment, the contents are, for example, a broadcast content and a network content. The broadcast content is a content provided via broadcast waves. The broadcast content is a content provided, for example, via digital broadcast waves. The broadcast content is transmitted from a not-illustrated broadcast station, or the like. The digital broadcast waves are broadcast waves based on the standard of the digital terrestrial broadcasting.

It is to be noted that the digital broadcast waves are not limited to the digital broadcast waves based on the standard of the digital terrestrial broadcasting but may be broadcast waves based on the standard of other digital broadcast.

It is assumed that the broadcast content is coded by a coding method based on the MPEG2-TS (Transport Stream) standard. It is to be noted that the broadcast content is not limited to the MPEG2-TS standard but may be a content that is coded by other methods.

It is to be noted that the broadcast content may be a content provided via one-segment broadcasting. In this case, the broadcast content is coded by a coding method based on the H.264/AVC standard, for example.

In the description below, a broadcast content of a program on a certain channel is called a broadcast program content. The broadcast program content includes information related to a corresponding program (hereinafter referred to as program information). The program information indicates an ending time of the corresponding program. It is to be noted that the program information also indicates information other than the ending time of the program, such as a title of the program, details of the program, and so on.

In the present embodiment, it is assumed that a network content is a content streamed via wireless communication from a content server connected to a network, for example. The wireless communication is carried out using a wireless LAN (Wireless Local Area Network), for example. It is to be noted that the wireless communication is not limited to the wireless LAN but may be a communication using other techniques.

It is assumed here that the network content is coded by a coding method based on the MPEG2-TS standard, for example.

The network content includes information related to the network content (hereinafter referred to as net content information). The net content information indicates a reproduction time (length) of the network content. In the description below, the reproduction time of the network content is also called content length.

It is to be noted that the net content information also indicates information other than the reproduction time, such as a title and details of the network content, and so on.

The content reproduction apparatus 1000 is a mobile phone, for example. It is to be noted that the content reproduction apparatus 1000 is not limited to a mobile phone. The content reproduction apparatus 1000 may be a PDA (Personal Digital Assistant), for example.

With reference to FIG. 1, the content reproduction apparatus 1000 includes: a first acquisition unit 111; a second acquisition unit 112; a first power supply unit 121; a second power supply unit 122; a control unit 130; a reproduction unit 140; a power supply control unit 150; a reception state detecting units 161 and 162; a timer 170; and an instruction receiving unit 180.

The first power supply unit 121 supplies power to the first acquisition unit 111 and the reception state detecting unit 161, in response to an instruction from the power supply control unit 150. The power supplied to the first acquisition unit 111 is larger than the power supplied to the reception state detecting unit 161. It is to be noted that the power supplied to the first acquisition unit 111 may be the same as the power supplied to the reception state detecting unit 161. Each of the first acquisition unit 111 and the reception state detecting unit 161 operates with power supplied by the first power supply unit 121. More specifically, each of the first acquisition unit 111 and the reception state detecting unit 161 operates only during a period in which power is supplied by the first power supply unit 121.

The second power supply unit 122 supplies power to the second acquisition unit 122 and the reception state detecting unit 162, in response to an instruction from the power supply control unit 150. The power supplied to the second acquisition unit 122 is larger than the power supplied to the reception state detecting unit 162. It is to be noted that the power supplied to the second acquisition unit 112 may be the same as the power supplied to the reception state detecting unit 162.

Each of the second acquisition unit and the reception state detecting unit 162 operates with power supplied by the second power supply unit 122. More specifically, each of the second acquisition unit 112 and the reception state detecting unit 162 operates only during a period in which power is supplied by the second power supply unit 122.

It is to be noted that, each of the control unit 130, the reproduction unit 140, the power supply control unit 150; the timer 170; and the instruction receiving unit 180 are constantly supplied with power by a non-illustrated power supply unit.

The first acquisition unit 111 receives a first content delivered from outside, thereby acquiring the first content.

The first content is a broadcast program content or a network content. In addition, the broadcast program content is a broadcast content. In the case where the first content is a broadcast program content, the first acquisition unit 111 has a broadcast receiving function. The broadcast receiving function is a function of receiving a digital broadcast wave (broadcast content) transmitted from a broadcast station, demodulating the received digital broadcast wave to acquire a demodulated signal, and acquiring, from the demodulated signal, a broadcast program content (broadcast content) of a channel instructed by the control unit 130.

In the case where the first content is a network content, the first acquisition unit 111 has a wireless communication function. The wireless communication function is a function of receiving a network content streamed via wireless communication from the above-stated content server, using the wireless LAN. It is to be noted that the wireless communication function is not limited to the above function but may be a function which uses a wireless technique based on other standards.

The first acquisition unit 111 transmits the first content to the reproduction unit 140.

The first acquisition unit 111 operates with larger power than the power supplied to the reception state detecting unit 161, for performing the processes of acquiring the first content.

The second acquisition unit 112 receives a second content delivered from outside, thereby acquiring the second content. The second content is a network content or a broadcast program content. In the case where the second content is a network content, the second acquisition unit 112 has the wireless communication function described above. In addition, in the case where the second content is a broadcast program content, the second acquisition unit 112 has the wireless communication function described above.

The second acquisition unit 112 transmits the second content to the reproduction unit 140.

The second acquisition unit 112 operates with larger power than the power supplied to the reception state detecting unit 162, for performing the processes of acquiring the second content.

It is to be noted that the content acquired by at least one of the first acquisition unit 111 and the second acquisition unit 112 is not limited to the above-described content but may be a content recorded on a non-transitory recording medium, such as a memory card and so on. The control unit 130, although the details will be given below, controls the first acquisition unit 111 and the second acquisition unit 112.

The reproduction unit 140 reproduces one of the first content and the second content which are received. The reproduction unit 140 includes a decoder 141, a display unit 142, and a speaker 143.

The display unit 142 has a function of displaying a character, an image, and so on. The display unit 142 is an apparatus in which an LCD panel (Liquid Crystal Display Panel) is used. It is to be noted that the display unit 142 may be an apparatus in which a panel of a display system other than the above-described display system is used. The speaker 143 outputs an audio.

The decoder 141 performs content decoding and reproducing processing. In the content decoding and reproducing processing, the decoder 141 decodes the content (the first or second content) on a predetermined unit basis. The predetermined unit is, for example, a single GOP (Group Of Pictures). The decoder 141 decodes the content (the first or second content) on a predetermined unit basis, thereby obtaining video data or audio data.

The decoder 141, every time the video data and the audio data are acquired, transmits the acquired video data and the audio data to the display unit 142 and the speaker 143, respectively.

The display unit 142 displays video based on the received video data. In addition, the speaker 143 outputs an audio based on the received audio data. Through the processes described above, part of content is reproduced.

The decoder 141 repeats the process of decoding a content on a predetermined unit basis, until decoding of the entire content is completed.

Through the content decoding and reproducing processing described above, the entire content (the first or second content) is reproduced. In addition, through the content decoding and reproducing processing, the decoder 141 decodes the first or second content, thereby obtaining the above-described program information or net content information. Then the decoder 141 notifies the power supply control unit 150 of the ending time of a program indicated by the program information or the content length indicated by the net content information.

The power supply control unit 150, although the details will be given below, controls the first power supply unit 121 and the second power supply unit 122. In addition, the power supply control unit 150 constantly identifies a power supplying state of each of the first power supply unit 121 and the second power supply unit 122.

The reception state detecting unit 161 constantly monitors the reception state of the first content received by the first acquisition unit 111. To be specific, the reception state detecting unit 161 measures receiving sensitivity of the first content received by the first acquisition unit 111, for each passing of a predetermined amount of time (for example, one second). It is to be noted that the measurement of the receiving sensitivity is carried out using a known technique.

In the description below, the receiving sensitivity of the first content is called first receiving sensitivity. The first receiving sensitivity is indicated by, for example, BER (Bit Error Rate).

The reception state detecting unit 161, every time the first receiving sensitivity is measured, notifies the power supply control unit 150 of the latest first receiving sensitivity.

The reception state detecting unit 162 constantly monitors the reception state of the second content received by the second acquisition unit 112. To be specific, the reception state detecting unit 162 measures receiving sensitivity of the second content received by the second acquisition unit 112, for each passing of a predetermined amount of time (for example, one second). It is to be noted that the measurement of the receiving sensitivity is carried out using a known technique.

In the description below, the receiving sensitivity of the second content is called second receiving sensitivity. The second receiving sensitivity is indicated by, for example, BER (Bit Error Rate).

The reception state detecting unit 162, every time the second receiving sensitivity is measured, notifies the power supply control unit 150 of the latest second receiving sensitivity.

The timer 170 measures current time. The timer 170, every time the current time changes, notifies the power supply control unit 150 of the latest current time after change.

The instruction receiving unit 180 receives an operation (instruction) of a non-illustrated button provided outside the content reproduction apparatus 1000. The operation of the button is an operation performed by a user. In the description below, the operation of the non-illustrated button provided outside the content reproduction apparatus 1000 is referred to as an interface operation M.

The interface operation M is an operation performed by a user. More specifically, the instruction receiving unit 180 receives an operation (instruction) performed by a user. The instruction receiving unit 180, upon receipt of the interface operation M (instruction), transmits the information of the interface operation M to the control unit 130 and the power supply control unit 150. Through the processes described above, each of the control unit 130 and the power supply control unit 150 performs processing corresponding to the interface operation M (instruction) received by the instruction receiving unit 180.

The following describes the processes (hereinafter referred to as content reproduction process) for reproducing a content performed by the content reproduction apparatus 1000.

The first content and the second content are a broadcast content and a network content, respectively, according to the present embodiment.

It is assumed here that the power of the content reproduction apparatus 1000 is off before the content reproduction process is performed.

First, a power-on operation is performed. The power-on operation is the interface operation M for turning-on the power of the content reproduction apparatus 1000. The power-on operation is, for example, an operation of pressing a power button.

Through this process, the power of the content reproduction apparatus 1000 is turned on. When the power of the content reproduction apparatus 1000 is turned on, an image for selecting a reproduction content is displayed on the display unit 142 as a menu image. The image for selecting a reproduction content is an image for selecting one of the first content and the second content as a content to be reproduced.

When the power of the content reproduction apparatus 1000 is turned on, power is supplied to each of the units included in the content reproduction apparatus 1000 other than the first acquisition unit 111, the reception state detecting unit 161, the second acquisition unit 112, and the reception state detecting unit 162, and each of the units to which power is supplied performs the above-described processes. The units to which power is supplied are the control unit 130, the reproduction unit 140, the power supply control unit 150, the timer 170, and the instruction receiving unit 180. More specifically, immediately after the power of the content reproduction apparatus 1000 is turned on, power is not supplied to the first acquisition unit 111, the reception state detecting unit 161, the second acquisition unit 112, and the reception state detecting unit 162.

In this case, the timer 170, every time the current time changes, notifies the power supply control unit 150 of the latest current time after change.

When the image for selecting a reproduction content is displayed, the content reproduction process is performed.

Figure 2:
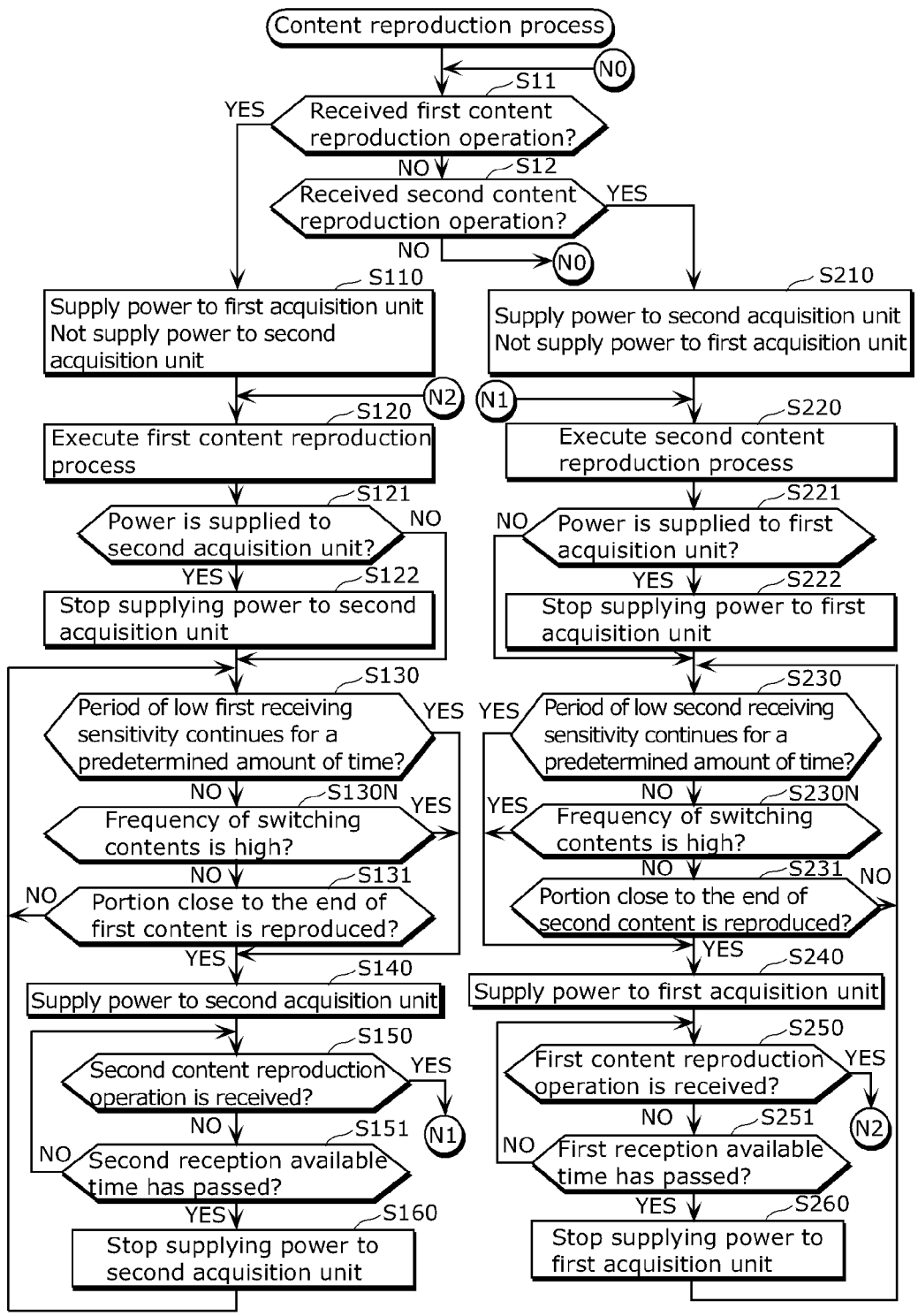
FIG. 2 is a flow chart which shows the processes of content reproduction processing.

FIG. 2 is a flowchart of the content reproduction process.

In Step S11, whether or not the instruction receiving unit 180 has received a first content reproduction operation is determined. The first content reproduction operation is the interface operation M for causing the content reproduction apparatus 1000 (the reproduction unit 140) to reproduce the first content. More specifically, the first content reproduction operation is an instruction (hereinafter also referred to as a first instruction) for causing the content reproduction apparatus 1000 to reproduce the first content.

When the result is YES in Step S11, the process proceeds to Step S110. On the other hand, when the result is NO in Step S11, the process proceeds to Step S12.

In Step S12, whether or not the instruction receiving unit 180 has received a second content reproduction operation is determined. The second content reproduction operation is the interface operation M for causing the content reproduction apparatus 1000 to reproduce the second content. More specifically, the second content reproduction operation is an instruction (hereinafter also referred to as a second instruction) for causing the content reproduction apparatus 1000 (the reproduction unit 140) to reproduce the second content.

When the result is YES in Step S12, the process proceeds to Step S210 described later. On the other hand, when the result is NO in Step S12, the process of Step S11 is performed once again.

It is assumed here that the first content reproduction operation (first instruction) is performed by a user.

In this case, the instruction receiving unit 180 receives the first content reproduction operation (the first instruction). Then, the instruction receiving unit 180 transmits the information of the first content reproduction operation to the control unit 130 and the power supply control unit 150. In this case, the process proceeds to Step S110.

In Step S110, the power supply control unit 150 transmits a first power supply instruction to the first power supply unit 121. The first power supply instruction is an instruction for supplying power to the first acquisition unit 111 and the reception state detecting unit 161. The first power supply unit 121, upon receipt of the first power supply instruction, supplies power to the first acquisition unit 111 and the reception state detecting unit 161.

The first acquisition unit 111 comes into the state of being capable of acquiring the first content, in response to the supply of power. At this time, in the case where a second content reproduction process described later is executed, the first acquisition unit 111 comes into the state of being capable of acquiring the first content during the reproduction of the second content.

The reception state detecting unit 161, as described above, measures the first receiving sensitivity for each passing of a predetermined amount of time during the period in which power is supplied, and notifies the power supply control unit 150 of the latest first receiving sensitivity every time the first receiving sensitivity is measured.

In addition, the power supply control unit 150, after transmitting the first power supply instruction, transmits a second power supply disabling instruction to the second power supply unit 122. The second power supply disabling instruction is an instruction for disabling supply of power to the second acquisition unit 112. More specifically, the second power supply disabling instruction is an instruction for prevent the second power supply unit 122 from supplying power to the second acquisition unit 112.

In the case where the power is being supplied to the second acquisition unit 112 when the second power supply disabling instruction is received, the second power supply unit 122 stops supply of power to the second acquisition unit 122. It is to be noted that, in the case where the power is not being supplied to the second acquisition unit 112 when the second power supply disabling instruction is received, the second power supply unit 122 does not perform any process.

In Step S120, the first content reproduction process is executed. The first content reproduction process is performed independently of other processes. Then, the process proceeds to Step S121.

It is to be noted that the first content is a broadcast program content (broadcast content) according to the present embodiment.

In the first content reproduction process, first, the control unit 130 transmits a first content acquisition instruction to the first acquisition unit 111. The first content acquisition instruction is an instruction for acquiring the first content. In this case, an initial channel is indicated in the first content acquisition instruction. The initial channel is a predetermined channel.

Upon receipt of the first content acquisition instruction, the first acquisition unit 111 performs a process of acquiring the broadcast program content.

In the process of acquiring the broadcast program content, first, the first acquisition unit 111 receives a digital broadcast wave (broadcast content) transmitted from a broadcast station, demodulates the received digital broadcast wave to acquire a demodulated signal, and acquires, from the demodulated signal, a broadcast program content of the channel (initial channel) instructed by the control unit 130. Then, the first acquisition unit 111 transmits the broadcast program content to the reproduction unit 140.

Upon receipt of the broadcast program content, the reproduction unit 140 performs the above-described content decoding and reproducing process on the broadcast program content, thereby reproducing the broadcast program content.

It is to be noted that the reproduction unit 140, upon receipt of the broadcast program content when reproducing the second content, ends the second content reproduction process. That is, the second content reproduction process ends at the same time when the reproduction of the first content is started.

According to the processes described above, it is possible to smoothly perform switching of reproduction from the second content to the first content.

In addition, in the content decoding and reproducing processing, the decoder 141 decodes the broadcast program content to acquire the above-described program information, and notifies the ending time of the program indicated by the program information to the power supply control unit 150, as described above.

In addition, in the first content reproduction process, when a channel change operation is performed by a user during the reproduction of the broadcast program content, a channel change process described below is performed. The channel change operation is the interface operation M for changing the channel. The channel change operation indicates a channel after change.

In the channel change process, the instruction receiving unit 180 receives a channel change operation and transmits the information of the first content reproduction operation to the control unit 130. The information of the channel change operation indicates a channel after change.

Upon receipt of the information of the channel change operation, the control unit 130 transmits a channel change instruction to the first acquisition unit 111. The channel change instruction indicates a channel after change.

Upon receipt of the channel change instruction, the first acquisition unit 111 performs processes in the same manner as in the process of acquiring a broadcast program content, thereby acquiring the broadcast program content of a channel after change indicated by the channel change instruction. The processes for reproducing the acquired broadcast program content are the same as the processes described above, and thus the detailed description for them will not be repeated. Through the processes described above, the broadcast program content is transmitted to the reproduction unit 140.

In this case as well, the decoder 141 decodes the broadcast program content to acquire the above-described program information, and notifies the ending time of the program indicated by the program information to the power supply control unit 150.

More specifically, the power supply control unit 150 determines that the content (broadcast program content) being reproduced by the reproduction unit 140 is changed the larger number of times, as the ending time is notified by the decoder 141 the larger number of times. More specifically, the power supply control unit 150 determines that the frequency of switching contents is high, in other words, contents are zapped when the number of times that the decoder 141 notifies the ending time is equal to or larger than a predetermined threshold in a predetermined amount of time.

In Step S121, the power supply control unit 150 determines whether or not the second power supply unit 122 supplies power to the second acquisition unit 112. When the result is YES in Step S121, the process proceeds to Step S122. On the other hand, when the result is NO in Step S121, the process proceeds to Step S130.

In Step S122, the power supply control unit 150 transmits a second power supply stop instruction to the second power supply unit 122. The second power supply stop instruction is an instruction for stopping the supply of power to the second acquisition unit 112 and the reception state detecting unit 162.

The second power supply unit 122, upon receipt of the second power supply stop instruction, stops the supply of power to the second acquisition unit 112 and the reception state detecting unit 162. The supply of power to the second acquisition unit 112 and the reception state detecting unit 162 is stopped after the reproduction of the first content is started. Then, the process proceeds to Step S130.

In Step S130, whether or not a period of low first receiving sensitivity continues for a predetermined amount of time is determined. The period of low first receiving sensitivity is a period in which the latest first receiving sensitivity sequentially received by the power supply control unit 150 from the reception state detecting unit 161 is equal to or lower than a first predetermined value. The first predetermined value is a value at which the reproduction unit 140 cannot properly reproduce the first content. The first content cannot be properly reproduced in the case, for example, where a noise or the like occurs in video displayed on the display unit 142 as a result of reproducing the first content by the reproduction unit 140.

To be specific, it is determined whether or not a period in which the latest first receiving sensitivity sequentially received by the power supply control unit 150 is equal to or lower than the first predetermined value continues for a predetermined amount of time (one minute, for example). That is, the power supply control unit 150 determines whether or not a predetermined condition related to a reproduction state of the first content is met. In this case, the predetermined condition is a condition that a period in which the latest first receiving sensitivity sequentially received is equal to or lower than the first predetermined value continues for a predetermined amount of time (one minute, for example).

When the result is YES in Step S130, the process proceeds to Step S140. On the other hand, when the result is NO in Step S130, the process proceeds to Step S130N.

When the result is YES in Step S130, the user is more likely to perform the operation for causing the content reproduction apparatus 1000 to reproduce the second content because the period in which a noise is included in displayed video continues. In other words, when the result is YES in Step S130, reproduction of the second content is more likely to be started.

In Step S130N, whether or not a frequency of switching contents is high is determined. More specifically, the power supply control unit 150 determines whether or not the number of times an ending time is notified from the decoder 141 in a predetermined amount of time is equal to or larger than a predetermined threshold. As described above, the power supply control unit 150 determines that the content (broadcast program content) being reproduced by the reproduction unit 140 is changed the larger number of times, as the ending time is notified by the decoder 141 the larger number of times.

The power supply control unit 150 determines that the frequency of switching contents (broadcast program contents) is high, in other words, contents are zapped, when the number of times that the decoder 141 notifies the ending time is equal to or larger than the predetermined threshold in a predetermined amount of time.

It is assumed here that the predetermined amount of time is five minutes and the predetermined threshold is five, for example. In this case, the power supply control unit 150 determines that the frequency of switching contents is high, in other words, contents are zapped, when the number of times that the decoder 141 notifies the ending time is equal to or larger than five in five minutes.

That is, the power supply control unit 150 determines whether or not a predetermined condition related to a reproduction state of the first content is met. In this case, the predetermined condition is a condition that the number of times the content reproduced by the reproduction unit 140 is changed in a predetermined amount of time is equal to or larger than a predetermined threshold.

When the result is YES in Step S130N, the process proceeds to Step S140. On the other hand, when the result is NO in Step S130N, the process proceeds to Step S131.

When the result is YES in Step S130N, the frequency of switching contents (broadcast program content) is high, in other words, contents are zapped, and the user is more likely to perform the operation for causing the content reproduction apparatus 1000 to reproduce the second content. In other words, when the result is YES in Step S130N, reproduction of the second content is more likely to be started.

In Step S131, it is determined whether or not a portion close to the end of the first content is reproduced. To be specific, the power supply control unit 150 determines whether or not a portion close to an end of the first content is reproduced by the reproduction unit 140. To be more specific, it is determined whether or not the amount of time from the latest current time notified to the power supply control unit 150 by the timer 170 to the ending time of the latest program notified by the decoder 141 is equal to or smaller than the first predetermined amount of time. The first predetermined amount of time is assumed to be 30 seconds, for example.

That is, the power supply control unit 150 determines whether or not a predetermined condition related to a reproduction state of the first content is met. In this case, the predetermined condition is a condition that the reproduction unit 140 reproduces the portion close to an end of the first content.

When the result is YES in Step S131, the process proceeds to Step S140. On the other hand, when the result is NO in Step S131, the process of Step S130 is performed once again.

When the result is YES in Step S131, the user is more likely to perform the operation for causing the content reproduction apparatus 1000 to reproduce the second content because the reproduction of the first content is close to the end. In other words, when the result is YES in Step S131, reproduction of the second content is more likely to be started.

In Step S140, the power supply control unit 150 transmits a second power supply instruction to the second power supply unit 122. The second power supply instruction is an instruction for supplying power to the second acquisition unit 112 and the reception state detecting unit 162. The second power supply unit 122, upon receipt of the second power supply instruction, supplies power to the second acquisition unit 112 and the reception state detecting unit 162.

The reception state detecting unit 162, as described above, measures the second receiving sensitivity for each passing of a predetermined amount of time during the period in which power is supplied, and notifies the power supply control unit 150 of the latest second receiving sensitivity every time the second receiving sensitivity is measured.

In Step S150, whether or not the instruction receiving unit 180 has received the second content reproduction operation is determined The second content reproduction operation is the interface operation M for causing the content reproduction apparatus 1000 (the reproduction unit 140) to reproduce the second content. More specifically, the second content reproduction operation is an instruction (hereinafter also referred to as a second instruction) for causing the content reproduction apparatus 1000 (the reproduction unit 140) to reproduce the second content.

When the result is YES in Step S150, the process proceeds to Step S220 described later. On the other hand, when the result is NO in Step S150, the process proceeds to Step S151.

In Step S151, the power supply control unit 150 determines whether or not a second reception available time has passed since the start of supply of power to the second acquisition unit 112 of the process in Step S140. Here, the second reception available time is an amount of time in which second content reproduction operation can be received. The second reception available time is a short amount of time necessary for the user to perform at least the second content reproduction operation. The second reception available time is one minute, for example.

When the result is YES in Step S151, the process proceeds to Step S160. On the other hand, when the result is NO in Step S151, the process of Step S150 is performed once again.

In Step S160, the power supply control unit 150 transmits the second power supply stop instruction to the second power supply unit 122. The second power supply stop instruction is an instruction for stopping the supply of power to the second acquisition unit 112 and the reception state detecting unit 162.

The second power supply unit 122, upon receipt of the second power supply stop instruction, stops the supply of power to the second acquisition unit 112 and the reception state detecting unit 162. Then, the process of Step S130 is performed once again.

In the description below, the period in which power is supplied to both of the first acquisition unit 111 and the second acquisition unit 112 is referred to as a power supply period A. The power supply period A is a period in which the power consumption of the content reproduction apparatus 1000 is large.

In the case were the second content reproduction operation is not performed between the processes of Steps S140 and S160, the power supply period A is an amount of time substantially the same as the second reception available time.

Through the processes of Steps S140, S150, S151, and S160 described above, it is possible to suppress the power supply period A in which a large amount of power is consumed, to the amount substantially the same as the second reception available time, even when the second content reproduction operation is not performed during the power supply period A. In other words, performing the processes of Steps S140 to S160 allows shortening as much as possible of the period in which the power consumption is large.

Next, it is assumed that the second content reproduction operation is executed during the period in which the processes of Steps S150 and S151 are repeatedly performed.

In this case, the instruction receiving unit 180 receives the second content reproduction operation (the second instruction). Then, the instruction receiving unit 180 transmits the information of the second content reproduction operation to the control unit 130 and the power supply control unit 150. In this case, the process proceeds to Step S220.

In Step S220, the second content reproduction process is executed. The second content reproduction process is performed independently of other processes. Then, the process proceeds to Step S221. It is to be noted that the second content is a network content in the present embodiment.

In the second content reproduction process, first, the control unit 130 transmits a second content acquisition instruction to the second acquisition unit 112. The second content acquisition instruction is an instruction for acquiring the second content. In this case, information for identifying the second content is indicated in the second content acquiring instruction.

In the description below, information for identifying the content is referred to as content identifying information. The information for identifying the above-described second content is the content identifying information. The content identifying information is a number, for example.

Upon receipt of the second content acquisition instruction, the second acquisition unit 112 performs a process of acquiring a network content.

In the process of acquiring a network content, first, the second acquisition unit 112 transmits, to the above-described content server, a content request for requesting for a network content identified by the content identifying information for the content server.

The content server, upon receipt of the content request, streams the requested network content to the content reproduction apparatus 1000 via wireless communication.

The second acquisition unit 112 receives the network content streamed by the content server using the wireless communication function and transmits the received network content to the reproduction unit 140.

Upon receipt of the network content, the reproduction unit 140 performs the above-described content decoding and reproducing process on the network content, thereby reproducing the network content.

It is to be noted that the reproduction unit 140, upon receipt of the network content when reproducing the first content through the first content reproduction process, ends the first content reproduction process. That is, the first content reproduction process ends at the same time when the reproduction of the second content is started. According to the processes described above, it is possible to smoothly perform switching of reproduction from the first content to the second content.

In addition, in the content decoding and reproducing processing, the decoder 141 decodes the network content to acquire the above-described net content information, and notifies a content length indicated by the net content information to the power supply control unit 150, as described above. The content length is thirty minutes, for example.

In the description below, the time at which an amount of time of the content length corresponding to the network content has passed since the start of the reproduction of the network content is referred to as an estimated time of ending reproduction.

In addition, in the second content reproduction process, when a net content change operation is performed by the user during the reproduction of the network content, a net content change process described below is performed. The net content change operation is the interface operation M for changing the network content being reproduced, to another network content. The net content change operation indicates change content identifying information for identifying the other network content.

In the net content change process, the instruction receiving unit 180 receives the net content change operation and transmits the information of the net content change operation to the control unit 130. The information of the net content change operation indicates change content identifying information. The change content identifying information is information (number, for example) for identifying the other network content.

Upon receipt of the information of the net content change operation, the control unit 130 transmits a net content change instruction to the second acquisition unit 112. The net content change instruction indicates the change content identifying information for identifying the other network content.

Upon receipt of the net content change instruction, the second acquisition unit 112 performs a process in the same manner as the above-described process of acquiring the network content, thereby acquiring, from the content server, the other network content identified by the change content identifying information indicated in the net content change instruction. The processes for reproducing the acquired other network content are the same as those described above, and thus the detailed description for them will not be repeated. In addition, in this case as well, the decoder 141 decodes the other network content to acquire net content information, and notifies the content length indicated by the net content information to the power supply control unit 150.

More specifically, the power supply control unit 150 determines that the content (network content) being reproduced by the reproduction unit 140 is changed the larger number of times, as the content length is notified by the decoder 141 the larger number of times. More specifically, the power supply control unit 150 determines that the frequency of switching contents is high, in other words, contents are zapped, when the number of times that the decoder 141 notifies the content length is equal to or larger than a predetermined threshold in a predetermined amount of time.

In Step S221, the power supply control unit 150 determines whether or not the first power supply unit 121 supplies power to the first acquisition unit 111. When the result is YES in Step S221, the process proceeds to Step S222. When the result is YES in Step S221, at least the processes of Steps S110 and S150 are performed before the process of Step S220 is performed.

On the other hand, when the result is NO in Step S221, the process proceeds to Step S230.

In Step S222, the power supply control unit 150 transmits a first power supply stop instruction to the first power supply unit 121. The first power supply stop instruction is an instruction for stopping the supply of power to the first acquisition unit 111 and the reception state detecting unit 161.

The first power supply unit 121, upon receipt of the first power supply stop instruction, stops the supply of power to the first acquisition unit 111 and the reception state detecting unit 161. The supply of power to the first acquisition unit 111 and the reception state detecting unit 161 is stopped after the reproduction of the second content is started. Then, the process proceeds to Step S230.

In Step S230, whether or not a period of low second receiving sensitivity continues for a predetermined amount of time is determined. The period of low second receiving sensitivity is a period in which the latest second receiving sensitivity sequentially received by the power supply control unit 150 from the reception state detecting unit 162 is equal to or lower than a second predetermined value. The second predetermined value is a value at which the reproduction unit 140 cannot properly reproduce the second content. The second content cannot be properly reproduced in the case, for example, where a noise or the like occurs in video displayed on the display unit 142 as a result of reproducing the second content by the reproduction unit 140.

To be specific, it is determined whether or not a period in which the latest second receiving sensitivity sequentially received by the power supply control unit 150 is equal to or lower than the second predetermined value continues for a predetermined amount of time (one minute, for example). That is, the power supply control unit 150 determines whether or not a predetermined condition related to a reproduction state of the second content is met. In this case, the predetermined condition is a condition that the latest second receiving sensitivity sequentially received continues to be equal to or lower than the second predetermined value for a predetermined amount of time (one minute, for example).

When the result is YES in Step S230, the process proceeds to Step S240. On the other hand, when the result is NO in Step S230, the process proceeds to Step S230N.

When the result is YES in Step S230, the user is more likely to perform the operation for causing the content reproduction apparatus 1000 to reproduce the first content because the period in which a noise is included in displayed video continues. In other words, when the result is YES in Step S230, reproduction of the first content is more likely to be started.

In Step S230N, whether or not a frequency of switching contents is high is determined. More specifically, the power supply control unit 150 determines whether or not the number of times the content length is notified from the decoder 141 in a predetermined amount of time is equal to or larger than a predetermined threshold. As described above, the power supply control unit 150 determines that the content (network content) being reproduced by the reproduction unit 140 is changed the larger number of times, as the content length is notified by the decoder 141 the larger number of times.

The power supply control unit 150 determines that the frequency of switching contents (network contents) is high, in other words, contents are zapped, when the number of times that the decoder 141 notifies the content length is equal to or larger than the predetermined threshold in a predetermined amount of time.

It is assumed here that the predetermined amount of time is five minutes and the predetermined threshold is five, for example. In this case, the power supply control unit 150 determines that the frequency of switching contents is high, in other words, contents are zapped, when the number of times that the decoder 141 notifies the content length is equal to or larger than five in five minutes.

That is, the power supply control unit 150 determines whether or not a predetermined condition related to a reproduction state of the second content is met. In this case, the predetermined condition is a condition that the number of times the content reproduced by the reproduction unit 140 is changed in a predetermined amount of time is equal to or larger than a predetermined threshold.

When the result is YES in Step S230N, the process proceeds to Step S240. On the other hand, when the result is NO in Step S230N, the process proceeds to Step S231.

When the result is YES in Step S230N, the frequency of switching contents (network content) is high, in other words, contents are zapped, and the user is more likely to perform the operation for causing the content reproduction apparatus 1000 to reproduce the first content. In other words, when the result is YES in Step S230N, reproduction of the first content is more likely to be started.

In Step S231, whether or not a portion close to the end of the second content is reproduced is determined. To be specific, the power supply control unit 150 determines whether or not the reproduction unit 140 reproduces the portion close to the end of the second content. To be more specific, it is determined whether or not the amount of time from the latest current time notified to the power supply control unit 150 by the timer 170 to the estimated time of ending reproduction corresponding to the network content being reproduced is equal to or smaller than the second predetermined amount of time. The second predetermined amount of time is assumed to be 30 seconds, for example.

That is, the power supply control unit 150 determines whether or not a predetermined condition related to a reproduction state of the second content is met. In this case, the predetermined condition is a condition that the reproduction unit 140 reproduces the portion close to an end of the second content.

When the result is YES in Step S231, the process proceeds to Step S240. On the other hand, when the result is NO in Step S231, the process of Step S230 is performed once again.

When the result is YES in Step S231, the user is more likely to perform the operation for causing the content reproduction apparatus 1000 to reproduce the first content because the reproduction of the second content is close to the end. In other words, when the result is YES in Step S231, reproduction of the first content is more likely to be started.

In Step S240, the power supply control unit 150 transmits a first power supply instruction to the first power supply unit 121. The first power supply instruction is an instruction for supplying power to the first acquisition unit 111 and the reception state detecting unit 161. The first power supply unit 121, upon receipt of the first power supply instruction, supplies power to the first acquisition unit 111 and the reception state detecting unit 161.

The reception state detecting unit 161, as described above, measures the first receiving sensitivity for each passing of a predetermined amount of time during the period in which power is supplied, and notifies the power supply control unit 150 of the latest first receiving sensitivity every time the first receiving sensitivity is measured.

In Step S250, whether or not the instruction receiving unit 180 has received the above-described first content reproduction operation (the first instruction) is determined. When the result is YES in Step S250, the process of Step S120 is performed once again. On the other hand, when the result is NO in Step S250, the process proceeds to Step S251.

In Step S251, the power supply control unit 150 determines whether or not a first reception available time has passed since the start of supply of power to the first acquisition unit 112 of the process in Step S240. Here, the first reception available time is an amount of time in which the first content reproduction operation can be received. The first reception available time is a short amount of time necessary for the user to perform at least the first content reproduction operation. The first reception available time is one minute, for example.

When the result is YES in Step S251, the process proceeds to Step S260. On the other hand, when the result is NO in Step S251, the process of Step S250 is performed once again.

In Step S260, the power supply control unit 150 transmits a first power supply stop instruction to the first power supply unit 121. The first power supply stop instruction is an instruction for stopping the supply of power to the first acquisition unit 111 and the reception state detecting unit 161.

The first power supply unit 121, upon receipt of the first power supply stop instruction, stops the supply of power to the first acquisition unit 111 and the reception state detecting unit 161. Then, the process of Step S230 is performed once again.

As described above, the period in which power is supplied to both of the first acquisition unit 111 and the second acquisition unit 112 is referred to as the power supply period A. The power supply period A is a period in which large power is consumed.

In the case were the first content reproduction operation is not performed between the processes of Steps S240 and S260, the power supply period A is an amount of time substantially the same as the first reception available time.

Through the processes of Steps S240, S250, S251, and S260 described above, it is possible to suppress the power supply period A in which a large amount of power is consumed, to the amount substantially the same as the first reception available time, even when the first content reproduction operation is not performed during the power supply period A. In other words, performing the processes of Steps S240 to S260 allows shortening as much as possible of the period in which the power consumption is large.

It is assumed here that the first content reproduction operation is executed during the period in which the processes of Steps S250 and S251 are repeatedly carried out.

In this case, the instruction receiving unit 180 receives the first content reproduction operation (the first instruction). Then, the instruction receiving unit 180 transmits the information of the first content reproduction operation to the control unit 130 and the power supply control unit 150. In this case, the process proceeds to Step S120.

In Step S120, the above-described first content reproduction process is executed. The first content reproduction processes are the same as those describe above, and thus the detailed description for them will not be repeated. According to the processes described above, it is possible to smoothly perform switching of reproduction from the second content to the first content.

After that, the processes of the above-described Steps S121 and S122 are performed, thereby stopping the supply of power to the second acquisition unit 112 and the reception state detecting unit 162.

It is to be noted that, when the result is YES in the above-described Step S12, the process proceeds to Step S210.

In Step S210, the power supply control unit 150 transmits the second power supply instruction to the second power supply unit 122. The second power supply instruction is an instruction for supplying power to the second acquisition unit 112 and the reception state detecting unit 162.

The second power supply unit 122, upon receipt of the second power supply instruction, supplies power to the second acquisition unit 112 and the reception state detecting unit 162.

The second acquisition unit 112, when the power is supplied, is in the state of being capable of acquiring the second content. At this time, in the case where the first content reproduction process is executed, the second acquisition unit 112 comes into the state of being capable of acquiring the second content during the reproduction of the first content.

The reception state detecting unit 162, as described above, measures the second receiving sensitivity for each passing of a predetermined amount of time during the period in which power is supplied, and notifies the power supply control unit 150 of the latest second receiving sensitivity every time the second receiving sensitivity is measured.

In addition, the power supply control unit 150, after transmitting the second power supply instruction, transmits a first power supply disabling instruction to the first power supply unit 121. The first power supply disabling instruction is an instruction for disabling supply of power to the first acquisition unit 111. More specifically, the first power supply disabling instruction is an instruction for prevent the first power supply unit 121 from supplying power to the first acquisition unit 111.

In the case where the power is supplied to the first acquisition unit 111 when the first power supply disabling instruction is received, the first power supply unit 121 stops supply of power to the first acquisition unit 111. It is to be noted that, in the case where the power is not supplied to the first acquisition unit 111 when the first power supply disabling instruction is received, the first power supply unit 121 does not perform any process.

In the present embodiment as described above, in the case where the predetermined condition is met during the reproduction of the first content (YES in Steps S130, S130N, or S131), power for acquiring the second content is supplied to the second acquisition unit 112. More specifically, power is supplied to the second acquisition unit 112 during the reproduction of the first content, and the second acquisition unit 112 becomes operable.

Then, the second content reproduction process is executed after the second content reproduction operation is performed, and thus it is possible to smoothly perform switching of reproduction from the first content to the second content. The first content and the second content are contents independently acquired by the first acquisition unit 111 and the second acquisition unit 112, respectively. Thus, it is possible to smoothly perform switching of reproduction between two contents which are independently acquired.

In addition, the supply of power to the first acquisition unit 111 and the reception state detecting unit 161 is stopped after the reproduction of the second content is started. This therefore allows shortening as much as possible of the power supply period A in which the power consumption is large.

Accordingly, it is possible to smoothly switch reproduction between plural contents which are independently acquired, while suppressing the power consumption.

In addition, when power control is performed with which power supply and stop of power supply for the first acquisition unit 111 and the second acquisition unit 112 are frequently repeated, there are some cases where the power consumption rather increases. In view of the above, according to the present embodiment, power supply cannot be carried out until the predetermined condition (continuation for a predetermined amount of time) is met, as explained in the above-stated Steps S130 or S230. This also makes it possible to suppress increase in unnecessary power consumption due to the frequent power control.

In addition, in the case where the predetermined condition is met during the reproduction of the second content (YES in Steps S230, S230N, or S231), power for acquiring the first content is supplied to the first acquisition unit 111, according to the present embodiment. More specifically, power is supplied to the first acquisition unit 111, and the first acquisition unit 111 becomes operable during the reproduction of the second content.

Then, the first content reproduction process is executed after the first content reproduction operation is performed, and thus it is possible to smoothly perform switching of reproduction from the second content to the first content. Thus, it is possible to smoothly perform switching of reproduction between two contents which are independently acquired.

In addition, the supply of power to the second acquisition unit 112 and the reception state detecting unit 162 is stopped after the reproduction of the first content is started. This therefore allows shortening as much as possible of the power supply period A in which the power consumption is large.

Accordingly it is possible to smoothly switch the reproduction between plural contents which are independently acquired, while suppressing the power consumption. Thus, even when switching of reproduction is performed between plural contents, a user can view the video displayed on the display unit 142 without feeling stress.

Modification of Embodiment 1

The first content and the second content are a network content and a broadcast program content, respectively, according to the modification of the present embodiment. The following describes processes for reproducing a content (hereinafter referred to as a content reproduction process A) in this case.

A content reproduction apparatus according to a modification of the present embodiment is the content reproduction apparatus 1000 shown in FIG. 1. Accordingly, detailed explanation for the configuration and functions of the content reproduction apparatus 1000 will not be repeated.

It is assumed here that the power of the content reproduction apparatus 1000 is off before the content reproduction process A is performed.

First, a power-on operation is performed in the same manner as in Embodiment 1. With this, the power of the content reproduction apparatus 1000 is turned on, and an image for selecting a reproduction content described above is displayed on the display unit 142.

When the content reproduction apparatus 1000 is turned on, power is supplied to each of the units included in the content reproduction apparatus 1000 other than the first acquisition unit 111, the reception state detecting unit 161, the second acquisition unit 112, and the reception state detecting unit 162, and each of the units to which power is supplied performs the above-described processes. The units to which power is supplied are the control unit 130, the reproduction unit 140, the power supply control unit 150, the timer 170, and the instruction receiving unit 180. More specifically, immediately after the content reproduction apparatus 1000 is turned on, power is not supplied to the first acquisition unit 111, the reception state detecting unit 161, the second acquisition unit 112, and the reception state detecting unit 162.

In this case, the timer 170, every time the current time changes, notifies the power supply control unit 150 of the latest current time after change.

When the image for selecting a reproduction content is displayed, the content reproduction process A is performed. The image for selecting a reproduction content is an image for selecting one of the first content and the second content as a content to be reproduced, as described above.

Figure 3:
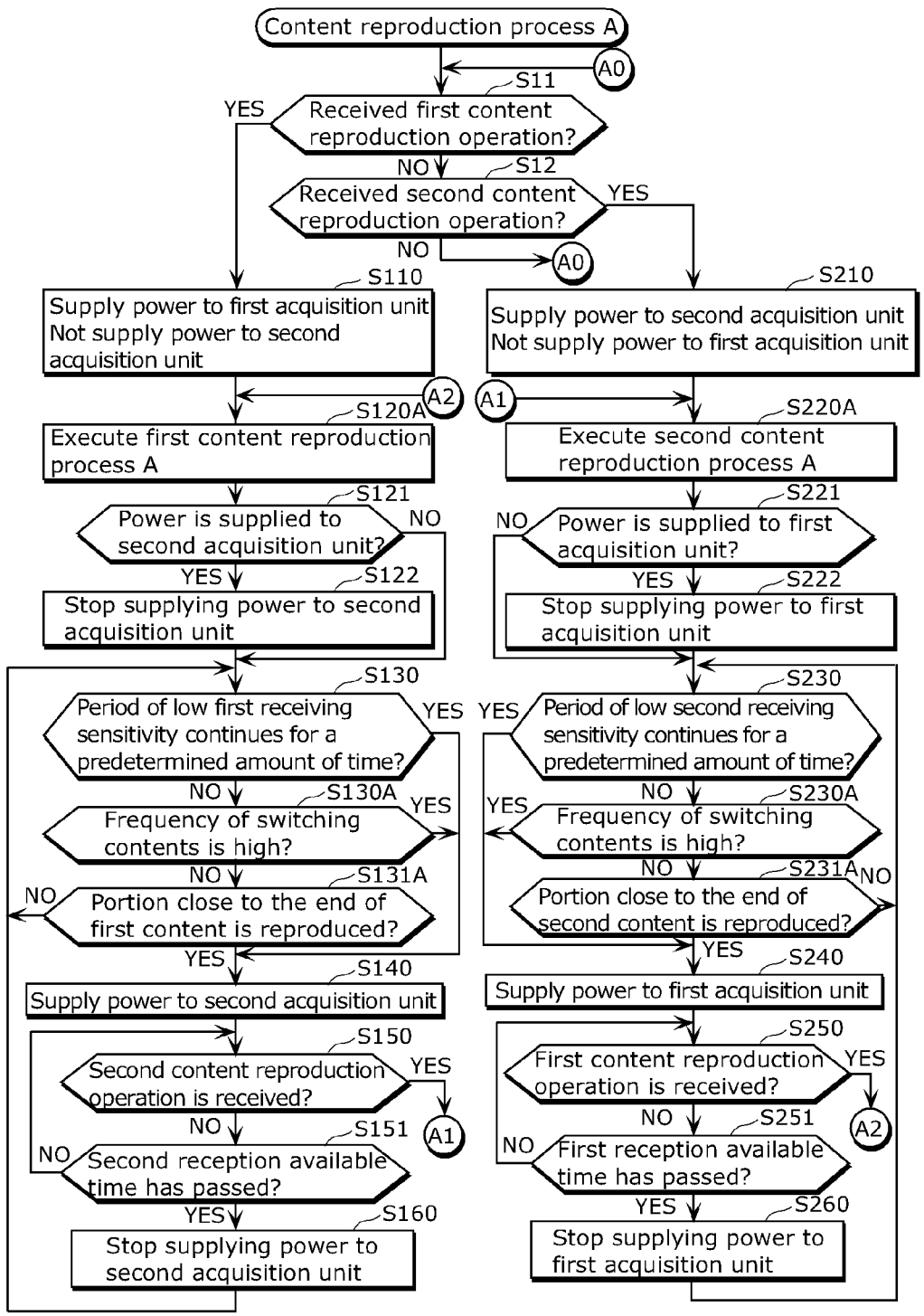
FIG. 3 is a flow chart which shows a content reproduction process A.

FIG. 3 is a flowchart of the content reproduction process A. In FIG. 3, a process of the same step number as that of FIG. 2 is substantially the same as the process described in Embodiment 1, and thus the detailed explanations will not be repeated.

The content reproduction process A is different from the content reproduction process in FIG. 2 in that Steps S120A, S131A, S130A, S220A, S230A, and S231A are performed instead of Steps S120, S131, S130N, S220, S230N, and S231.

In Steps S11 and S12, substantially the same processes as the processes described in Embodiment 1 are performed.

It is assumed here that the first content reproduction operation (first instruction) is performed. In this case, the process proceeds to Step S110.

In Step S110, substantially the same process as the process described in Embodiment 1 is performed.

In Step S120A, the first content reproduction process A is executed. The first content reproduction process A is performed independently of other processes. Then, the process proceeds to Step S121.

The first content reproduction process A is substantially the same as the second content reproduction process that is performed in Step S220 in FIG. 2, and thus the detailed description will not be repeated. A simple explanation will be given below.

In the first content reproduction process A, first, the control unit 130 transmits a first content acquisition instruction to the first acquisition unit 111. The first content acquisition instruction is an instruction for acquiring the first content. In this case, information for identifying the first content is indicated in the first content acquisition instruction.

Upon receipt of the first content acquisition instruction, the first acquisition unit 111 performs a process of acquiring a network content A.

In the process of acquiring a network content A, first, the first acquisition unit 111 transmits, to the above-described content server, a content request for requesting for a network content identified by the content identifying information for the content server.

The content server, upon receipt of the content request, streams the requested network content to the content reproduction apparatus 1000 via wireless communication.

The first acquisition unit 111 receives the network content streamed by the content server using the wireless communication function and transmits the received network content to the reproduction unit 140. Upon receipt of the network content, the reproduction unit 140 performs the above-described content decoding and reproducing process on the network content, thereby reproducing the network content.

It is to be noted that the reproduction unit 140, upon receipt of the network content when reproducing the second content through the second content reproduction process A, ends the second content reproduction process A. That is, the second content reproduction process A ends at the same time when the reproduction of the first content is started.

According to the processes described above, it is possible to smoothly perform switching of reproduction from the second content to the first content.

In addition, in the content decoding and reproducing processing, the decoder 141 decodes the network content to acquire the above-described net content information, and notifies the content length indicated by the net content information to the power supply control unit 150, as described above.

In addition, in the first content reproduction process A, when a net content change operation is performed by a user during the reproduction of the network content, a net content change process A is performed. The net content change process A is a process substantially the same as the net content change process described above.

The net content change process A is substantially the same as a process in which the second acquisition unit 112 is replaced with the first acquisition unit 111 in the above-described net content change process, and thus the detailed explanation will not be repeated.

As described above, the power supply control unit 150 determines that the content (network content) being reproduced by the reproduction unit 140 is changed the larger number of times, as the content length is notified by the decoder 141 the larger number of times.

In Steps S121 and S122, substantially the same processes as the processes described in Embodiment 1 are performed.

In Step S130, substantially the same process as the process described in Embodiment 1 is performed. When the result is YES in Step S130, the process proceeds to Step S140. On the other hand, when the result is NO in Step S130, the process proceeds to Step S130A.

In Step S130A, substantially the same process as the process of Step S230N in FIG. 2 is performed, and thus the detailed explanation will be omitted. A simple explanation will be given below.

In Step S130A, whether or not a frequency of switching contents is high is determined. More specifically, the power supply control unit 150 determines whether or not the number of times the content length is notified from the decoder 141 in a predetermined amount of time is equal to or larger than a predetermined threshold. As described above, the power supply control unit 150 determines that the content (network content) being reproduced by the reproduction unit 140 is changed the larger number of times, as the content length is notified by the decoder 141 the larger number of times.

The power supply control unit 150 determines that the frequency of switching contents (network contents) is high, in other words, contents are zapped, when the number of times that the decoder 141 notifies the content length is equal to or larger than the predetermined threshold in a predetermined amount of time.

That is, the power supply control unit 150 determines whether or not a predetermined condition related to a reproduction state of the first content is met. In this case, the predetermined condition is a condition that the number of times the content reproduced by the reproduction unit 140 is changed in a predetermined amount of time is equal to or larger than a predetermined threshold.

When the result is YES in Step S130, the process proceeds to Step S140. On the other hand, when the result is NO in Step S130A, the process proceeds to Step S131A.

In Step S131A, it is determined whether or not a portion close to the end of the first content is reproduced. To be specific, the power supply control unit 150 determines whether or not the reproduction unit 140 reproduces the portion close to an end of the first content. To be more specific, it is determined whether or not the amount of time from the latest current time notified to the power supply control unit 150 by the timer 170 to the estimated time of ending reproduction corresponding to the network content being reproduced is equal to or smaller than the first predetermined amount of time.

The first predetermined amount of time is assumed to be 30 seconds, for example.

That is, the power supply control unit 150 determines whether or not a predetermined condition related to a reproduction state of the first content is met. In this case, the predetermined condition is a condition that the reproduction unit 140 reproduces the portion close to an end of the first content.

When the result is YES in Step S131A, the process proceeds to Step S140. On the other hand, when the result is NO in Step S131A, the process of Step S130 is performed once again.

In Step S140, substantially the same process as the process described in Embodiment 1 is performed. The second power supply unit 122, upon receipt of the second power supply instruction, supplies power to the second acquisition unit 112 and the reception state detecting unit 162.

In Steps S150, S151, and S160, substantially the same processes as the processes described in Embodiment 1 are performed.

It is assumed here that the second content reproduction operation is executed during the period in which the processes of Steps S150 and S151 are repeatedly performed. In this case, the process of Step S220A is performed.

In Step S220A, a second content reproduction process A is executed. The second content reproduction process A is performed independently of other processes. Then, the process proceeds to Step S221.

The second content reproduction process A is substantially the same as the first content reproduction process that is performed in Step S120 in FIG. 2, and thus the detailed description will not be repeated. A simple explanation will be given below.

In the second content reproduction process A, first, the control unit 130 transmits a second content acquisition instruction to the second acquisition unit 112.

Upon receipt of the second content acquisition instruction, the second acquisition unit 112 performs a process of acquiring the broadcast program content A. The process of acquiring the broadcast program content A is the same as the process of acquiring the broadcast program content described above, and thus the detailed description for them will not be repeated. A simple explanation will be given below.

In the process of acquiring the broadcast program content A, first, the second acquisition unit 112 receives a digital broadcast wave (broadcast content) transmitted from a broadcast station, demodulates the received digital broadcast wave to acquire a demodulated signal, and acquires, from the demodulated signal, a broadcast program content of a channel (initial channel) instructed by the control unit 130.

Then, the second acquisition unit 112 transmits the broadcast program content to the reproduction unit 140.

Upon receipt of the broadcast program content, the reproduction unit 140 performs the above-described content decoding and reproducing process on the broadcast program content, thereby reproducing the broadcast program content.

It is to be noted that the reproduction unit 140, upon receipt of the broadcast program content when reproducing the first content through the first content reproduction process A, ends the first content reproduction process A. That is, the first content reproduction process A ends at the same time when the reproduction of the second content is started.

According to the processes described above, it is possible to smoothly perform switching of reproduction from the first content to the second content.

In addition, in the content decoding and reproducing processing, the decoder 141 decodes the broadcast program content to acquire the above-described program information, and notifies the ending time of a program indicated by the program information to the power supply control unit 150, as described above.

In addition, in the second content reproduction process A, when a channel change operation is performed by a user during the reproduction of the broadcast program content, a channel change process A is performed.

The channel change process A is substantially the same as a process in which the first acquisition unit 111 is replaced with the second acquisition unit 112 in the above-described channel change process, and thus the detailed explanation will not be repeated.

Through the channel change process A, the power supply control unit 150 determines that the content (broadcast program content) being reproduced by the reproduction unit 140 is changed the larger number of times, as the ending time is notified by the decoder 141 the larger number of times.

In Steps S221 and S222, substantially the same processes as the processes described in Embodiment 1 are performed.

In Step S230, substantially the same process as the process described in Embodiment 1 is performed. When the result is YES in Step S230, the process proceeds to Step S240. On the other hand, when the result is NO in Step S230, the process proceeds to Step S230A.

In Step S230A, substantially the same process as the process of Step S130N is performed, and thus the detailed explanation will be omitted. A simple explanation will be given below.

In Step S230A, whether or not a frequency of switching contents is high is determined. More specifically, the power supply control unit 150 determines whether or not the number of times an ending time is notified from the decoder 141 in a predetermined amount of time is equal to or larger than a predetermined threshold. As described above, the power supply control unit 150 determines that the content (broadcast program content) being reproduced by the reproduction unit 140 is changed the larger number of times, as the ending time is notified by the decoder 141 the larger number of times.

That is, the power supply control unit 150 determines whether or not a predetermined condition related to a reproduction state of the second content is met. In this case, the predetermined condition is a condition that the number of times the content reproduced by the reproduction unit 140 is changed in a predetermined amount of time is equal to or larger than a predetermined threshold.

When the result is YES in Step S230A, the process proceeds to Step S240. On the other hand, when the result is NO in Step S230A, the process proceeds to Step S231A.

In Step S231A, it is determined whether or not a portion close to an end of the second content is reproduced. To be specific, the power supply control unit 150 determines whether or not the reproduction unit 140 reproduces the portion close to an end of the second content. To be more specific, it is determined whether or not the amount of time from the latest current time notified to the power supply control unit 150 by the timer 170 to the ending time of the latest program notified by the decoder 141 is equal to or smaller than the second predetermined amount of time. The second predetermined amount of time is assumed to be 30 seconds, for example.

That is, the power supply control unit 150 determines whether or not a predetermined condition related to a reproduction state of the second content is met. In this case, the predetermined condition is a condition that the reproduction unit 140 reproduces the portion close to an end of the second content.

When the result is YES in Step S231A, the process proceeds to Step S240. On the other hand, when the result is NO in Step S231A, the process of Step S230 is performed once again.

In Step S240, substantially the same process as the process described in Embodiment 1 is performed. The first power supply unit 121, upon receipt of the first power supply instruction, supplies power to the first acquisition unit 111 and the reception state detecting unit 161.

In Steps S250, S251, and S260, substantially the same processes as the processes described in Embodiment 1 are performed.

It is assumed here that the first content reproduction operation is executed during the period in which the processes of Steps S250 and S251 are repeatedly performed. In this case, the process of Step S120A is performed.

In Step S120A, the above-described first content reproduction process A is executed. The first content reproduction process A is the same as the process describe above, and thus the detailed description for them will not be repeated. Through the first content reproduction process A, it is possible to smoothly perform switching of reproduction from the second content to the first content.

After that, the processes of the above-described Steps S121 and S122 are performed, thereby stopping the supply of power to the second acquisition unit 112 and the reception state detecting unit 162.

The content reproduction process A in the case where the first content and the second content are a network content and a broadcast program content, respectively, is performed.

With this, in the modification of the present embodiment, it is also possible to obtain substantially the same advantageous effect as that of Embodiment 1. Accordingly it is possible to smoothly switch reproduction between plural contents which are independently acquired, while suppressing the power consumption.

[External View of the Content Reproduction Apparatus]

Figure 4:
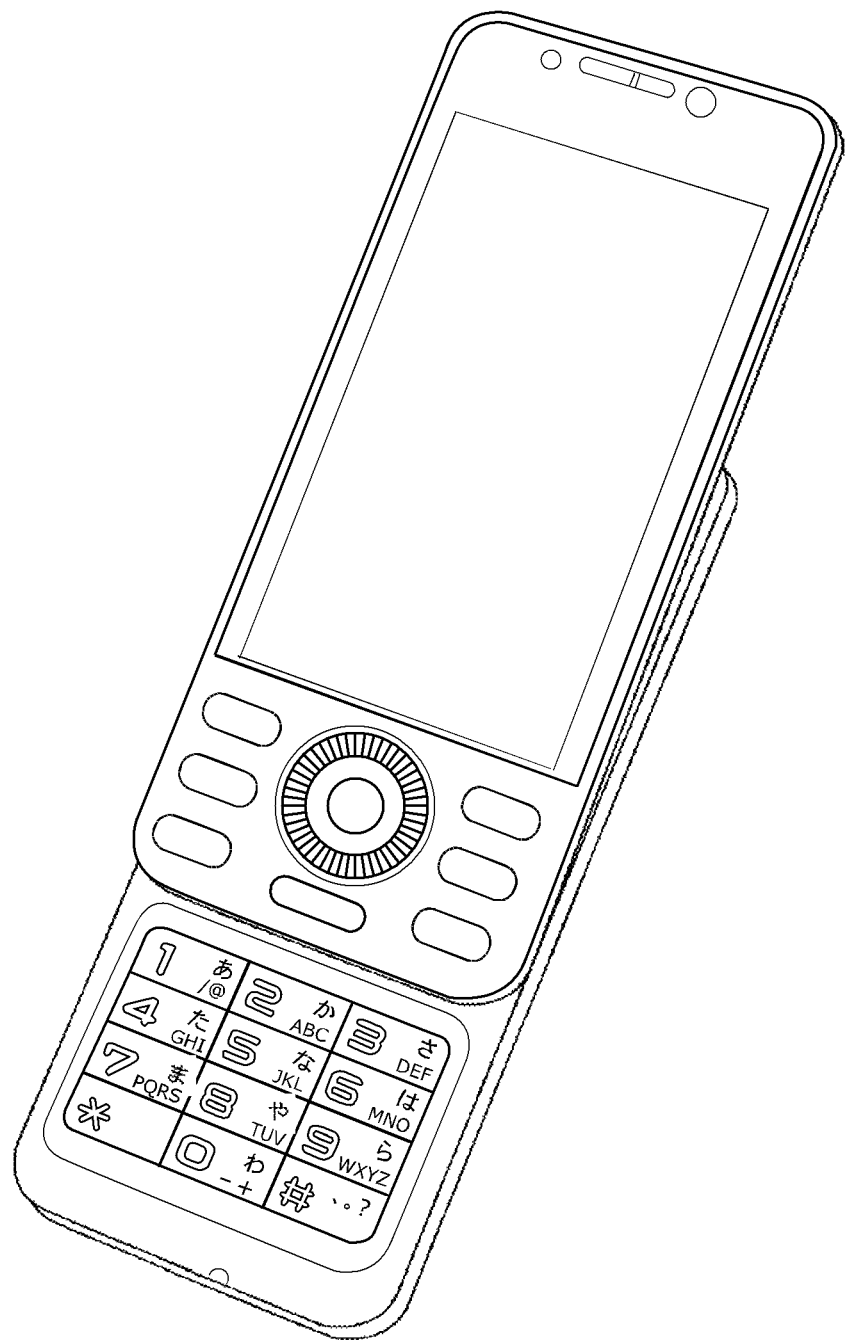
FIG. 4 shows an example of an external view of the content reproduction apparatus.
Figure 5:
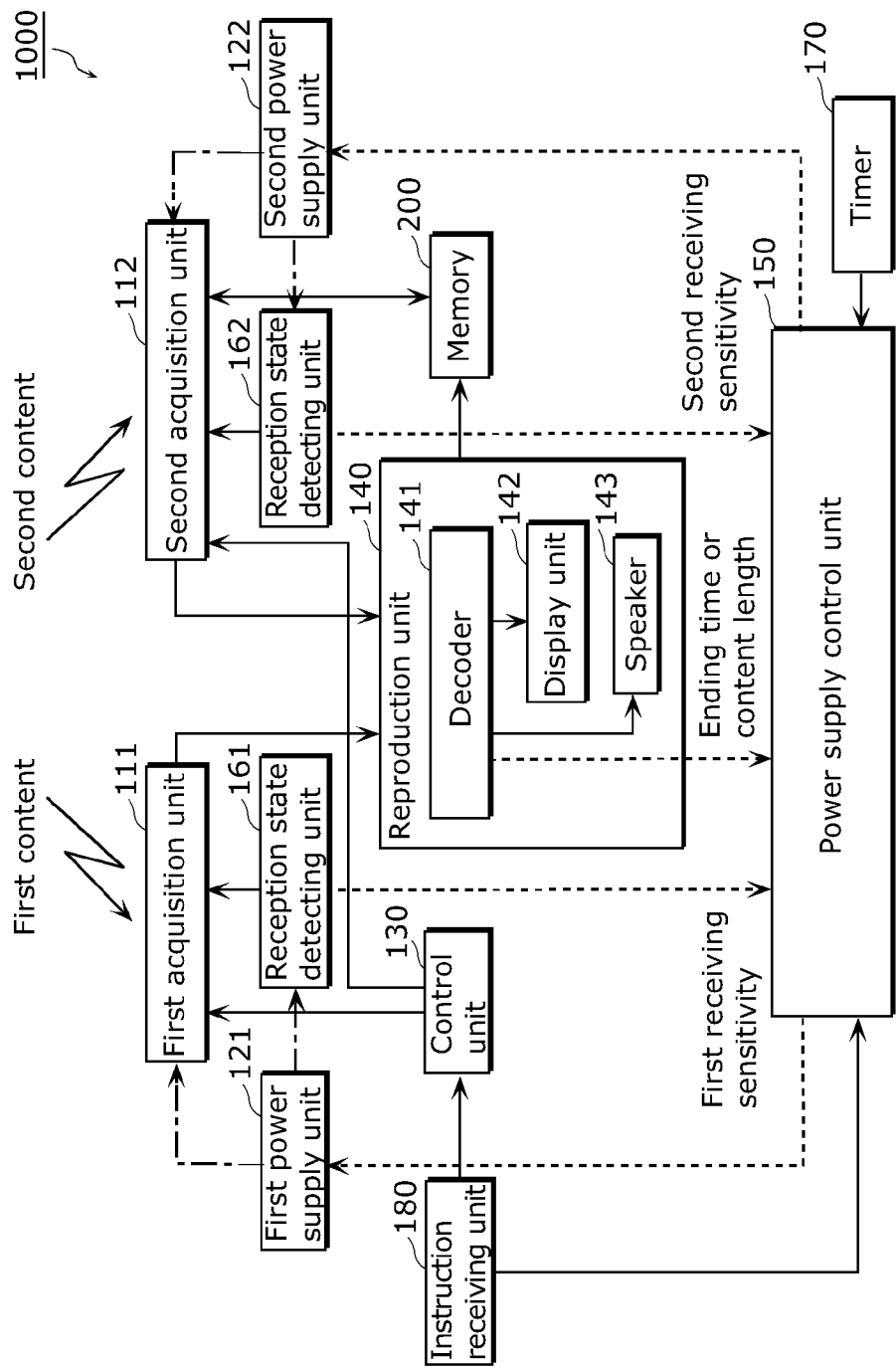
FIG. 5 is a diagram which shows a configuration of a content reproduction apparatus according to a modification example.

FIG. 4 shows an example of an external view of the content reproduction apparatus 1000. FIG. 4 shows an example of an external view of the content reproduction apparatus 1000 when the content reproduction apparatus 1000 is a mobile phone.

Other Modification

When the first content and the second content are the broadcast program content and the network content, respectively, the second acquisition unit 112 performs the process of requesting for a network content to the content server in the process of acquiring a network content of the second content reproduction process. However, the present invention is not limited to this.

The content reproduction apparatus 100, for example, may include a memory 200 for storing an URL (Uniform Resource Locator) for acquiring a network content.

It is assumed here that the net content information (metadata) obtained through the content decoding and reproducing processing performed by the decoder 141 indicates the above-described URL as well.

In this case, the decoder 141, when the URL is obtained through the content decoding and reproducing processing, causes the memory 200 to store the URL.

Then, in the second content reproduction process of Step S220 shown in FIG. 2, for example, the second acquisition unit 112 accesses the URL stored in the memory 200, thereby acquiring the network content.

Through the processes described above, the second acquisition unit 112 can promptly acquire the network content.

In addition, the predetermined condition that is determined in each of the content reproduction process in FIG. 2 and the content reproduction process A in FIG. 3 is not limited to the condition described in the processes of Steps S130, S130N, S131, S230, S230N, and S231.

The predetermined condition may be any condition as long as a user is more likely to perform the operation to causes the content reproduction apparatus 1000 to reproduce a content of a different type from the content being reproduced with the condition.

It is to be noted that the first content reproduction process is executed in the case where the instruction receiving unit 180 receives the first content reproduction operation. However, the present invention is not limited to this. Even in the case where the instruction receiving unit 180 does not receive the first content reproduction operation, the first content reproduction process may be executed when power is supplied to the first acquisition unit 111 from the first power supply unit 121 and the first acquisition unit 111 becomes operable. With this, the first acquisition unit 111 acquires the first content even when the first content reproduction operation is not received by the instruction receiving unit 180.

It is to be noted that the second content reproduction process is executed in the case where the instruction receiving unit 180 receives the second content reproduction operation. However, the present invention is not limited to this. Even in the case where the instruction receiving unit 180 does not receive the second content reproduction operation, the second content reproduction process may be executed when power is supplied to the second acquisition unit 112 from the second power supply unit 122 and the second acquisition unit 112 becomes operable. With this, the second acquisition unit 112 acquires the second content even when the second content reproduction operation is not received by the instruction receiving unit 180.

In addition, the content (first or second content) processed by the content reproduction apparatus 1000 is not limited to the broadcast program content or the network content but may be another content. The content processed by the content reproduction apparatus 1000 may be a content read from the recording medium, a content including only video, or a content including only audio, for example.

In addition, although the first content and the second content are assumed to be contents of types different from each other, the first content and the second content may be the contents of the same type.

In addition, although the content reproduction apparatus 1000 is assumed to include two acquisition units for acquiring contents of two types. However, the present invention is not limited to this. The content reproduction apparatus 1000 may include three or more acquisition units for acquiring contents of three or more types.

In addition, although the content reproduction apparatus 1000 according to the present invention has been described based on the embodiment, the present invention is not limited to this embodiment. Other forms in which various modifications apparent to those skilled in the art are applied to the embodiment, or forms structured by combining elements of different embodiments are included within the scope of the present invention, unless such changes and modifications depart from the scope of the present invention.

In addition, part or all of the constituent element included in the above-described content reproduction apparatus 1000 may be configured by hardware. In addition, part or all of the constituent element included in the above-described content reproduction apparatus 1000 may be configured as a module of a program execute by CPU (Central Processing Unit) or the like.

A part or all of the constituent elements constituting the content reproduction apparatus 1000 may be configured from a single System-LSI (Large-Scale Integration). The System-LSI is a super-multi-function LSI manufactured by integrating constituent units on one chip, and is specifically a computer system configured by including a microprocessor, a ROM (Read Only Memory), a RAM (Random Access Memory), and so on.

The control unit 130 and the power control unit 150 in FIG. 1, for example, may be configured by a single system LSI.

In addition, the present invention may be implemented as a power control method including the characteristic components included in the content reproduction apparatus 1000, as its steps. It should be noted that the present invention can be implemented as a program which, when loaded into a computer, allows a computer to execute each of the steps included in the power control method. In addition, the present invention may be implemented as a non-transitory computer-readable recording medium for storing such a program. Furthermore, the program may be distributed via a transmission medium such as the Internet.

It is to be noted that, the embodiment disclosed here is intended not for the purpose of limitation but for exemplification only. The scope of the present invention is indicated not by the above description but by the claims and includes various changes and modifications may be applied to the embodiments as shown above, unless such changes and modifications depart from the same or equivalent scope of the present invention.

INDUSTRIAL APPLICABILITY

The present invention can be utilized as a content reproduction apparatus that enables smoothly switching reproduction between plural contents independently acquired while suppressing power consumption.

The invention claimed is:

1. A content reproduction apparatus comprising:
a first acquisition unit and a second acquisition unit each configured to acquire a content and operate during a period in which power is supplied;
a first power supply unit configured to supply power to said first acquisition unit;
a second power supply unit configured to supply power to said second acquisition unit;
a power supply control unit configured to control the supply of power by each of said first power supply unit and said second power supply unit; and
a reproduction unit configured to reproduce one of a first content and a second content, the first content being a content acquired by said first acquisition unit, and the second content being a content acquired by said second acquisition unit,
wherein, when a predetermined condition related to a reproduction state of the first content is met during a reproduction period in which said reproduction unit is reproducing the first content, said power supply control unit is configured to cause said second power supply unit, which has stopped the supply of power, to supply power to said second acquisition unit in the reproduction period.

2. The content reproduction apparatus according to claim 1,
wherein said second acquisition unit is configured to acquire the second content after power is supplied from said second power supply unit,
said reproduction unit is configured to reproduce the second content acquired by said second acquisition unit, and said power supply control unit is configured to cause said first power supply unit to stop the supply of power to said first acquisition unit, after said reproduction unit starts reproduction of the second content.

3. The content reproduction apparatus according to claim 2, further comprising an instruction receiving unit configured to receive an instruction for causing said reproduction unit to reproduce one of the first content and the second content, wherein, when said instruction receiving unit receives a first instruction for causing said reproduction unit to reproduce the first content, said power supply control unit is configured to cause said first power supply unit to supply power to said first acquisition unit, and to control said second power supply unit so that power is not supplied to said second acquisition unit, when the predetermined condition related to the reproduction state of the first content is met during the reproduction period in which said reproduction unit is reproducing the first content in response to the first instruction received by said instruction receiving unit, said power supply control unit is configured to cause said second power supply unit to supply power to said second acquisition unit in the reproduction period, and said second acquisition unit is configured to acquire the second content when said instruction receiving unit receives, during a period in which power is supplied by said second power supply unit, a second instruction for causing said reproduction unit to reproduce the second content.

4. The content reproduction apparatus according to claim 1, wherein the predetermined condition is a condition that said reproduction unit reproduces a portion close to an end of the first content.

5. The content reproduction apparatus according to claim 1, wherein the predetermined condition is a condition that a period in which receiving sensitivity of the first content is equal to or lower than a predetermined value continues for a predetermined amount of time, the first content being received by said first acquisition unit, and the predetermined value is a value at which said reproduction unit cannot properly reproduce the first content received by said first acquisition unit.

6. The content reproduction apparatus according to claim 1, wherein the predetermined condition is a condition that the number of times the content reproduced by said reproduction unit is changed in a predetermined amount of time is equal to or larger than a predetermined threshold.

7. The content reproduction apparatus according to claim 1, wherein the first content is a content provided via broadcast waves.

8. The content reproduction apparatus according to claim 1, wherein the second content is a content provided via a network.

9. A power control method performed by a content reproduction apparatus that includes:

a first acquisition unit and a second acquisition unit each of which acquires a content and operates during a period in which power is supplied;

a first power supply unit which supplies power to the first acquisition unit;

a second power supply unit which supplies power to the second acquisition unit;

a power supply control unit which controls the supply of power by each of the first power supply unit and the second power supply unit; and a reproduction unit which reproduces one of a first content and a second content, the first content being a content acquired by the first acquisition unit, and the second content being a content acquired by the second acquisition unit, said power control method comprising:

when a predetermined condition related to a reproduction state of the first content is met during a reproduction period in which the reproduction unit is reproducing the first content, causing the second power supply unit, which has stopped the supply of power, to supply power to the second acquisition unit in the reproduction period, said causing being performed by the power supply control unit; and reproducing the second content acquired by the second acquisition unit, after power is supplied from the second power supply unit, said reproducing being performed by the reproduction unit.

* * * * *